United States Patent
Liou et al.

(10) Patent No.: US 7,890,847 B2
(45) Date of Patent: Feb. 15, 2011

(54) APPARATUS AND METHOD FOR CALCULATING ERROR METRICS IN A DIGITAL COMMUNICATION SYSTEM

(75) Inventors: Ming-Luen Liou, Taipei County (TW); Rong-Liang Chiou, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1012 days.

(21) Appl. No.: 11/684,029

(22) Filed: Mar. 9, 2007

(65) Prior Publication Data
US 2008/0222461 A1 Sep. 11, 2008

(51) Int. Cl.
*H03M 13/03* (2006.01)
(52) U.S. Cl. .................. 714/790; 375/340; 375/262
(58) Field of Classification Search .............. 714/790; 375/262, 287, 340
See application file for complete search history.

(56) References Cited

U.S. PATENT DOCUMENTS

| | | | |
|---|---|---|---|
| 5,434,886 A | 7/1995 | Kazawa et al. | |
| 5,668,820 A | 9/1997 | Ramesh et al. | |
| 5,691,992 A | 11/1997 | Molnar et al. | |
| 5,708,665 A | 1/1998 | Luthi et al. | |
| 5,812,603 A | 9/1998 | Luthi et al. | |
| 6,728,323 B1 | 4/2004 | Chen et al. | |
| 7,131,055 B2* | 10/2006 | Mathew et al. | 714/795 |
| 7,478,306 B2 | 1/2009 | Okamoto et al. | |
| 2003/0192001 A1 | 10/2003 | Maiuzzo et al. | |
| 2009/0055717 A1* | 2/2009 | Au et al. | 714/784 |

OTHER PUBLICATIONS

Office Action mailed in related U.S. Appl. No. 11/160,927, dated Apr. 3, 2009.

* cited by examiner

*Primary Examiner*—Sam Rizk
(74) *Attorney, Agent, or Firm*—Thomas, Kayden, Horstemeyer & Risley (57) ABSTRACT

A method and an apparatus for calculating an error metric in a digital communication receiver. In the receiver, an input data stream is used to generate at least one input bit stream. The combinational logic unit performs an error-check operation on delayed and current bits of the input bit stream using a polynomial error-check equation previously determined. Finally, an accumulator is used to accumulate a number of trials with respect to the error check operation and generates a nominal error-check number based on the number of the correct trials.

32 Claims, 9 Drawing Sheets

APPARATUS AND METHOD FOR CALCULATING ERROR METRICS IN A DIGITAL COMMUNICATION SYSTEM

CROSS-REFERENCE TO RELATED APPLICATIONS

This application is related to U.S. patent application Ser. No. 11/675,664 entitled "Apparatus and Method for Determining a Detected Punctured Position in Punctured Convolutional Codes" (filed on 16 Feb. 2007), which is assigned to the same applicant and is hereby incorporated in its entirety herein by this reference.

BACKGROUND

The invention relates to digital communication. In particular, the invention relates to calculate error metrics in a receiver of a digital communication system using an error check relation associated with encoding or puncturing properties employed in the digital communication system.

In modern communication systems, finding an efficient error-check metrics is an essential factor to measure of communication performance. The apparatus generally only use one distinct method to each of estimate symbol error rate, calculating burst error, or other applications related to calculating convolution errors. Generally speaking, the prior method used only comparing the received data having through the whole communication system with predetermined threshold to detect burst error in the communication or with profound the estimation data to calculated symbol error rate. In order to acquire better estimation and detection, calculating the error should be random and real-time.

Thus, a need exists for a method and an apparatus for calculating error metrics to facilitate performance measurement in digital communication applications.

SUMMARY

An embodiment of the invention provides an apparatus and method for calculating error metrics in a digital communication receiver, which includes a decision unit, a combinational logic unit, and an accumulator. The decision unit receives an input data stream to generate at least one input bit stream. In the case of an input data stream is a symbol stream, the data stream is transformed into coded bit stream. In the case of an input stream is a parallel coded bits, the data stream is converted into coded bit stream. The combinational logic operation on delayed and current bits of the input bit stream in accordance with a polynomial error-check equation to generate an error-check bit stream. Finally, an accumulator is used to accumulate a number of trials with respect to said error-check bit stream and generates a nominal error-check number based on the number of the correct trials. The apparatus can be applied to 8-Vestigial sideband (8-VSB) standard, ITU-T Recommendation J.83Annex B standard, DVB standard, or other standards at least need to calculate convolution errors. Thus, by using a nominal error-check number, the apparatus is capable of determine an estimated symbol error rate, burst error, puncturing positions, or other detection and estimation techniques using in the similar art to achieve the object of the invention.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION

Preferred embodiments of the invention are demonstrated herein, which are not intended to limit the scope of the invention. In the preferred embodiments, two digital communication applications are illustrated. One is for estimating symbol error rate and the other is for detecting the burst error. In the application of digital communication, the examples of 8-level vestigial sideband (8-VSB) standard and ITU-R Recommendation J-83 Annex B (the J83B standard) are to be further illustrated using claimed invention error-check detector. First of all, a generalized apparatuses for determining a symbol error rate and burst error rate detection according to the embodiments is discussed.

Figure 1:
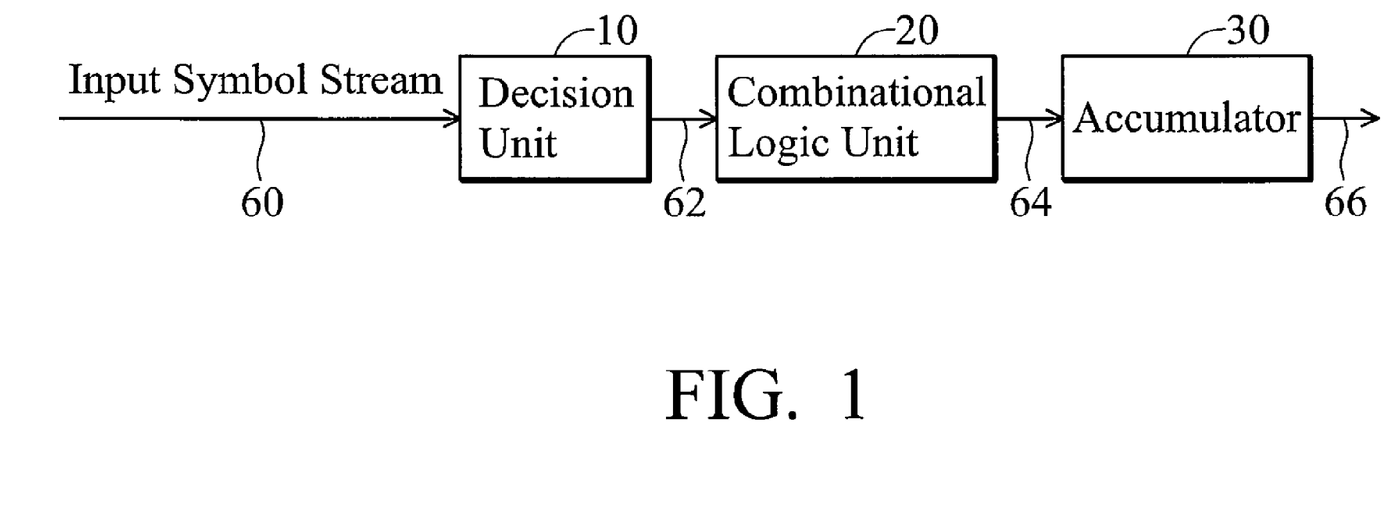
FIG. 1 is a block diagram of an apparatus for determining an estimated symbol error rate in accordance with embodiments of the invention.

FIG. 1 is a block diagram of an apparatus for calculating an error metric in a receiver, which includes a decision unit 10, a combinational logic unit 20, and an accumulator 30. At least one input data stream 60, which generally comes from an equalizer in the receiver, is inputted. Decision unit 10 receives the input data stream 60 and generates at least one input bit stream 62. Combinational logic unit 20 performs a combinational logic operation on delayed and current bits of the at least one input bit stream 62 in accordance with a polynomial error-check equation to generate an error-check bit stream 64, representing results of the combinational logic operation. That is, the combinational logic unit 20 performs an error-check operation on the input bit stream. It is noted that, in the preferred embodiments, the polynomial error-check equation is an identity inherent in the coding scheme applied in the corresponding transmitter. Thus, the error-check equation varies with the applied coding scheme, but can be previously determined or approximated by the known structure of the transmitter. Finally Accumulator 30 accumulates a number of trials with respect to the error check bit stream and generates a nominal error-check number 66 based on the number of the correct trials. Furthermore, a accumulator comprises an adder for summing the error-check bit stream and a feedback number stream to form an accumulated number stream, a buffer for storing the accumulated number stream to form the feedback number stream, and means for generate the nominal error-check number based on a value stored in the buffer. In the prefer embodiments, the nominal error-check error number/rate could be parity check error rate or calculating error number/rate based on variously error-check method in the digital communication, specially related to the method need to implement with convolution or puncturing applications.

Apparently, in an embodiment of the invention, the structure and the coding scheme applied in the transmitter should be studied to find out an identity to be the polynomial error-check equation.

First Embodiment

Figure 2:
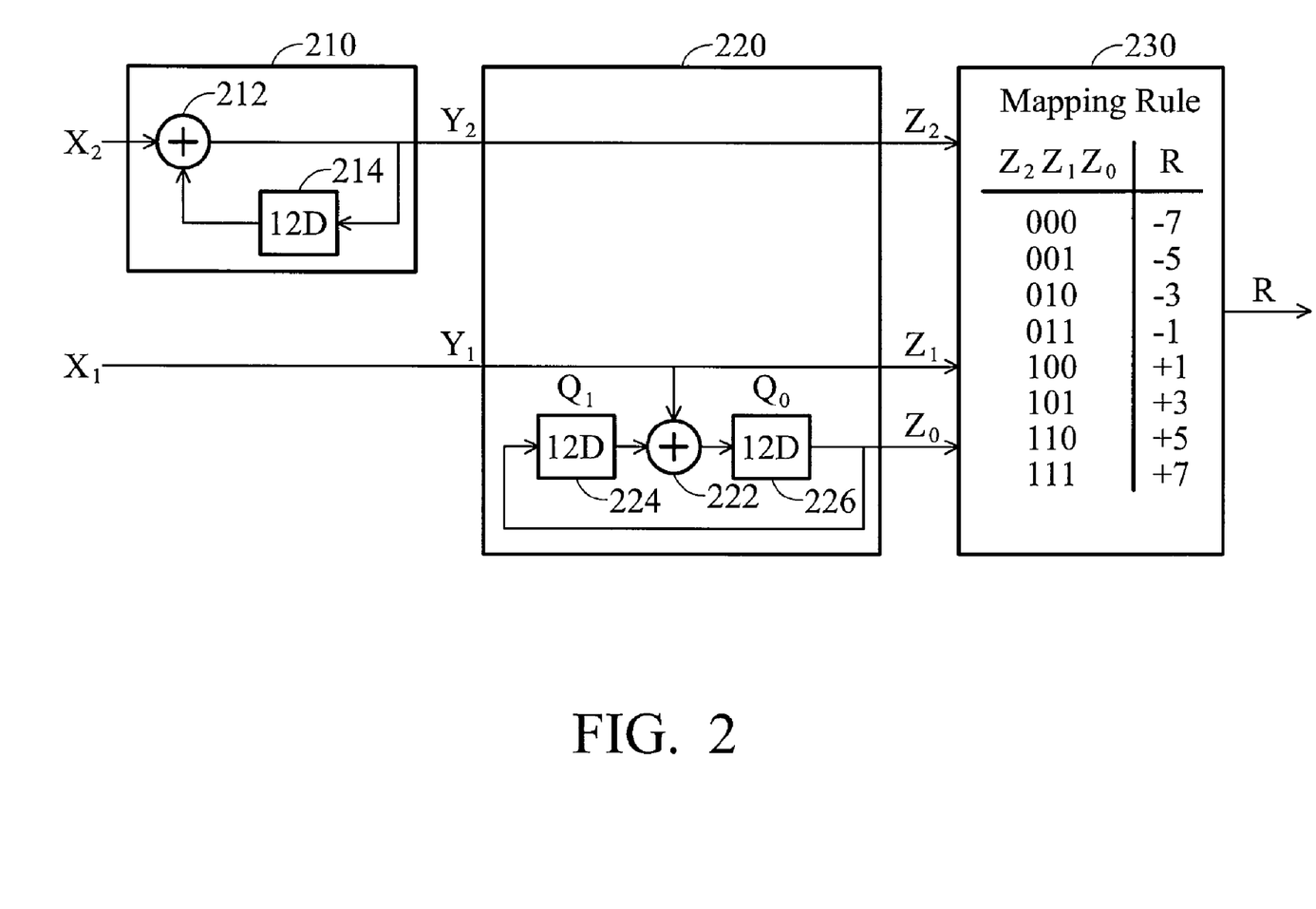
FIG. 2 is a block diagram of a trellis code modulation (TCM) block of a digital communication transmitter complying with the 8-level vestigial sideband (8-VSB) standard in accordance with the first embodiment of the invention.

In the first embodiment, the communication system complying with the 8-VSB modulation scheme is applied. FIG. 2 is a block diagram of a TCM block of the transmitter complying with the 8-VSB standard in accordance with the embodiment, which includes an interference filter pre-coder 210, a trellis encoder 220 and an 8-level symbol mapper 230. The interference filter pre-coder 210 receives two information bit streams $X_1$ and $X_2$ and generates two bit streams $Y_1$ and $Y_2$, respectively. The interference filter pre-coder 210 has an XOR logic gate 212 and a delay element 214 with a 12-symbol delay period, and receives the bit stream $X_2$ to generate the bit stream $Y_2$. The trellis encoder 220 receives two bit streams $Y_1$ and $Y_2$ and generates three output bit streams $Z_0$, $Z_1$ and $Z_2$. The trellis encoder 220 has an XOR logic gate 222 and two delay elements 224 and 226 with a 12-symbol delay period, which receive the bit stream $Y_1$ and generate the output bit stream $Z_0$ and $Z_1$. The 8-level symbol mapper 230 receives three output bit streams $Z_0$, $Z_1$ and $Z_2$, and generates an output symbol stream R using a symbol mapping rule shown in FIG. 2.

In the trellis encoder 220, the output bit streams $Z_0$ and $Z_1$ are determined by the bit stream $Y_1$ using the XOR logic gate 222 and the delay elements 224 and 226. According to the structure of the trellis encoder 220, three equations, which involve the output bit streams $Z_0$ and $Z_1$ but are irrelevant to the bit stream $Y_0$, can be determined.

$$Z_0[n]=Q_0[n-1]; \quad (1)$$

$$Q_0[n]=Z_1[n] \oplus Q_1[n-1]; \quad (2)$$

$$Q_1[n-1]=Z_0[n-1], \quad (3)$$

Where n represents an index and each increment corresponds to a 12-symbol delay period, and $Q_0$ and $Q_1$ represent the outputs of the delay elements 226 and 224, respectively.

Thus, an identity, $Z_0[n+1]=Z_1[n] \oplus Z_0[n-1]$, can be deduced based on equations (1), (2) and (3). Accordingly, the error check equation is determined as follows:

$$Z_0[n+1] \oplus Z_1[n] \oplus Z_0[n-1]=0 \quad (4)$$

Using the error-check equation (4) inherent in the transmitter complying with the 8-VSB standard, an apparatus for calculating an error metric can be designed and further determining an estimated symbol error rate.

Figure 3:
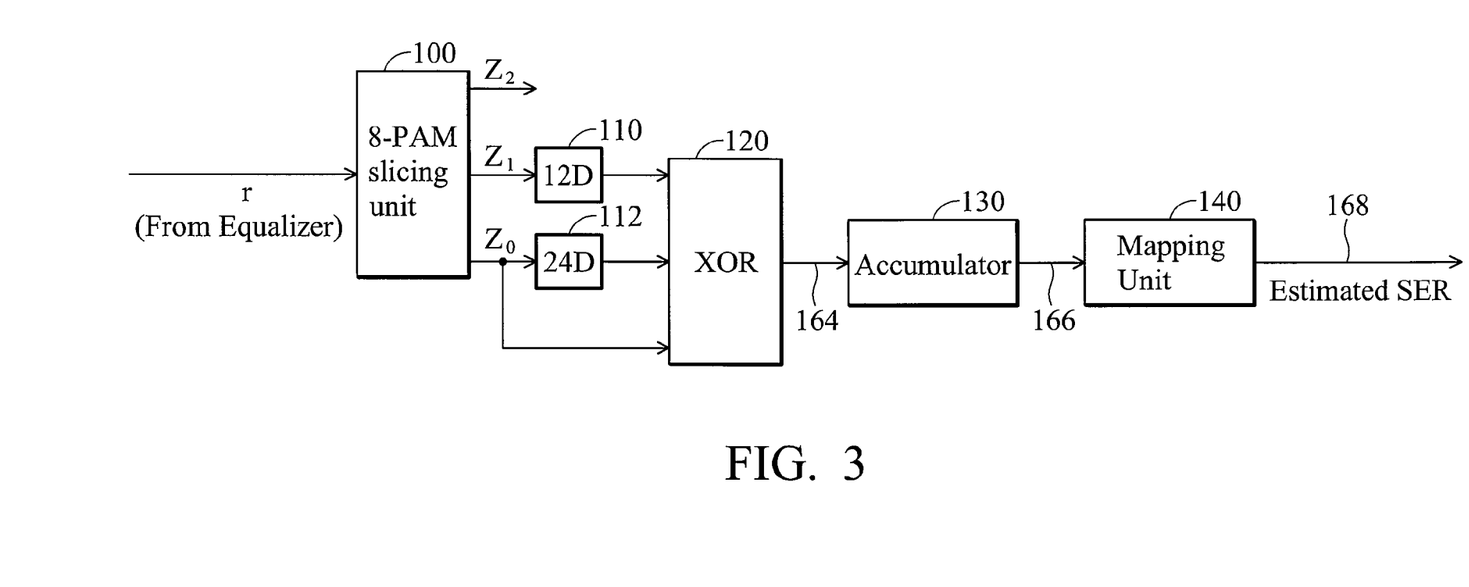
FIG. 3 is a block diagram of an apparatus for determining an estimated symbol error rate in a digital communication receiver in accordance with the first embodiment of the invention.

FIG. 3 is a block diagram of the apparatus for determining an estimated symbol error rate in the receiver in accordance with the first embodiment. As shown in FIG. 3, the apparatus includes an 8-PAM slicing unit 100, a delay element 110 with 12-symbol delay, a delay element 112 with 24-symbol delay, an XOR logic gate 120, an accumulator 130 and a mapping unit 140. In addition, delay elements 110 and 112 and the XOR logic gate 120 constitute the combinational logic unit 20 shown in FIG. 1. The 8-PAM slicing unit 100, delay element 110 and 112, the XOR logic gate 120 and an accumulator 130 constitute an error-check detector.

An input data stream r, which generally comes from an equalizer in the receiver front end, is inputted to the 8-PAM slicing unit 100. The 8-PAM slicing unit 100 generates three input bit streams $z_0$, $z_1$ and $z_2$ using the symbol mapping rule as shown in FIG. 2. If the input bit streams $z_0$, $z_1$ and $z_2$ are correct, which means the corresponding symbol in the input symbol stream r is correct. Thus, the delay elements 110 and 112 and the XOR logic gate 120 can be used to simplify equation (4). The delay element 110 delays the bit stream $z_1$ with a 12-symbol period. The delay element 112 delays the bit stream $z_0$ with a 24-symbol period. The XOR logic gate 120 receives the delayed bit stream from the delay element 110, the delayed bit stream from the delay element 112 and the bit stream $z_0$, to perform error checking operations and generate the error check bit stream 164, which represents results of the error checking operations. Apparently, in the embodiment, a logic value "0" in the parity check bit stream 164 represents a correct trial, and a logic value "1" represents an incorrect trial.

Next, the accumulator 130 accumulates a number of trials with respect to the error check bit stream 164 and generates a nominal error-check number 166 based on the number of the correct trials.

In this case is to use the claimed invention to estimate symbol error rate; thus, the mapping unit 140 is couple to the accumulator to convert the nominal error-check number 166 to an estimated symbol error rate (SER) 168 with respect to the input symbol stream r according to a predetermined relation between the nominal error-check number and the estimated symbol error rate, which can be determined if the error-check equation is known. In addition, the mapping unit 140 can alternatively inherently know nominal error-check rate from the data of the nominal error-check number. Therefore, a predetermined relation could be either between the nominal error-check number and the estimated symbol error rate or between the nominal error-check rate and the estimated symbol error rate.

In the embodiment, the relation between the nominal error-check error rate and the symbol error rate (SER) can be approximated as follows. Referring FIG. 2, the probability error of each bit stream could be obtained from mapping rule. Here is only use the simplest approximations, which assume probability error for each bit streams are independent and uncorrelated. This should be understood, the scope of invention should not only be limited thereto and various modification can be applied to approximate the relation between the nominal error-check number/rate and symbol error rate.

The nominal error-check error rate (NER) can be deduced as follows:

$$NER = P_e(z_0[n+1] \oplus z_1[n] \oplus z_0[n-1]) \quad (9)$$
$$= 2 \times P_e(z_0) \times (1 - P_e(z_0)) \times$$
$$(1 - P_e(z_1)) + P_e(z_1) \times (1 - P_e(z_0))^2 +$$
$$P_e(z_1) \times P_e(z_0)^2$$

In addition, the symbol error rate (SER) can be deduced as follows:

$$SER = 1 - (1 - P_e(z_0)) \times (1 - P_e(z_1)) \times (1 - P_e(z_2)) \quad (10)$$

Figure 4:
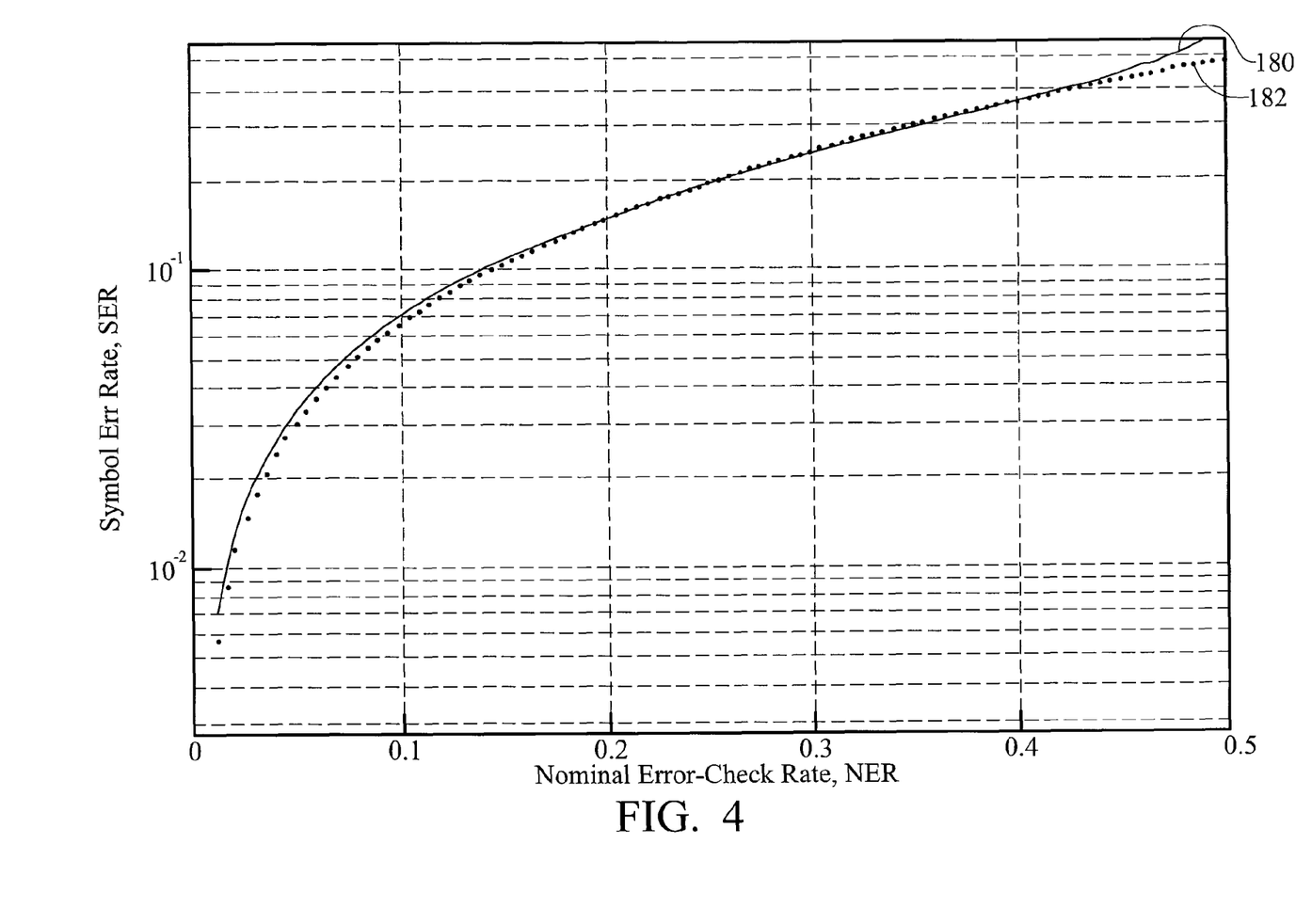
FIG. 4 is a graph showing the relation between the nominal error-check rate and the symbol error rate applied in the mapping unit in accordance with the first embodiment of the invention.

According to equations (9) and (10), a curve showing the relation between the NER and SER can be determined and illustrated in FIG. 4. In FIG. 4, numeral 180 denotes a plot of the curve directly determined by equations (9) and (10), and numeral 182 denotes a curve approximately fitting the curve 180. Alternatively, the linear curve, piece-wise linear approximation curve, or any other curve-fitting method can be used to approximate the symbol error rate.

Thus, in the embodiment, the mapping unit 140 can convert the NER 166 to the estimated SER 168 using equation (10).

As described above, the apparatus for determining the estimated SER in the receiver complying with the 8-VSB standard can utilize the predetermined error-check equation, which is deduced based on the transmitter, to achieve the object of the embodiment.

Second Embodiment

In the second embodiment, the communication system complying with the standard of the ITU-T Recommendation J.83 Annex B. (hereinafter called J83B) is applied. Similar to the first embodiment, the transmitter complying with the J83B standard is illustrated to find out the error-check equation, which can be used to verify the correctness of data received in the receiver.

Figure 5:
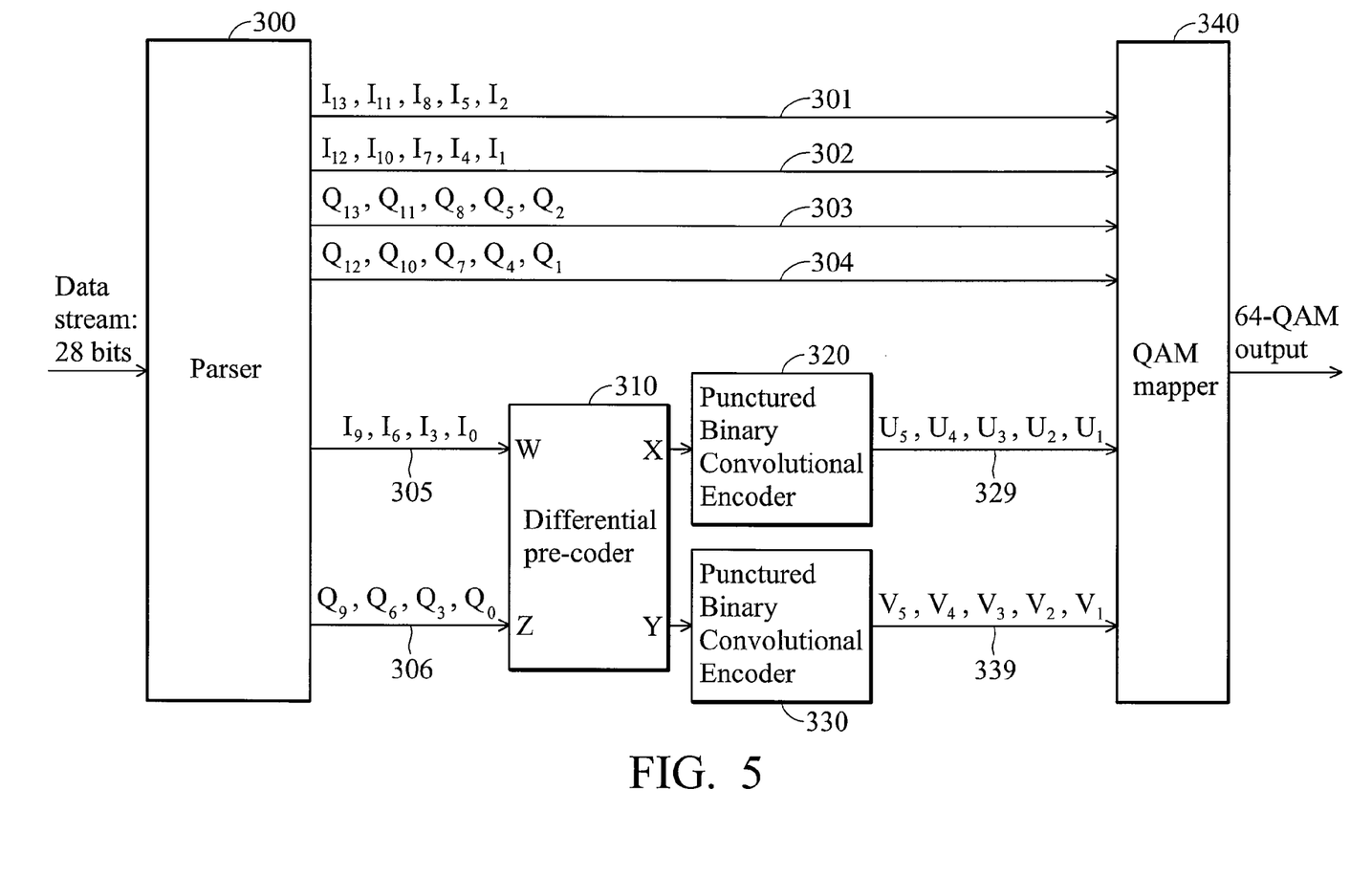
FIG. 5 is a block diagram of a TCM block of a digital communication transmitter complying with the ITU-R Recommendation J-83 Annex B (the J83B standard) in accordance with the second embodiment of the invention.

FIG. 5 is a block diagram of a TCM block in a transmitter complying with the J83B standard in accordance with the embodiment, which utilizes the 64-QAM modulation scheme. In FIG. 5, the TCM block serially receives a 7-bit data stream. Parser 300 identifies a group off our 7-bit symbols (i.e. 28 bits) and assigns as an in-phase "I" component and a quadrature "Q" component. As indicated in FIG. 5, for the I component, the parser 300 outputs two upper uncoded bit streams 302 ($I_1, I_4, I_7, I_{10}, I_{12}$) and 301 ($I_2, I_5, I_8, I_{11}, I_{13}$) and one lower coded bit stream 305 ($I_0, I_3, I_6, I_9$). For the Q component, the parser 300 outputs two upper uncoded bit streams 304 ($Q_1, Q_4, I_7, Q_{10}, Q_{12}$) and 306 ($Q_2, Q_5, Q_8, Q_{11}, Q_{13}$) and one lower coded bit stream 306 ($Q_0, Q_3, Q_6, Q_9$). The uncoded bit streams 301, 302, 303 and 304 are sent to a QAM mapper 340, and the coded bit streams 305 and 306 are sent to a differential pre-coder 310. The differential pre-coder 310 performs rotationally invariant trellis coding on I and Q bit pairs, that is, $Q_0$ and $I_0$, $Q_3$ and $I_3$, $Q_6$ and $I_6$, and $Q_9$ and $I_9$. The differential pre-coder 310 then transmits the differentially encoded lower streams X and Y (4 bits) to punctured binary convolutional encoders 320 and 330, respectively.

In the embodiment, punctured binary convolutional encoders 320 and 330 are ½-rate binary convolutional encoders with punctured codes. Usually, in the digital communication system, error correction codes are applied add redundancy to upgrade anti-noise capability. With the ½ code rate, the punctured binary convolutional encoders 320 and 330 receive four bits (X and Y) and generate 8 encoded bits. In addition, the puncture function applied in the encoders 320 and 330 is used to compensate the decrease in payload if all encoded bits are transmitted and the payload will be much reduced due to excessive redundancy, which bypasses the transmission of some of the encoded bits previously agreed on by the transmitter and the receiver. The punctured binary convolutional encoders 320 and 330, complying with the J83B standard, utilize a puncture rate ⅝, which means that only 5 bits are transmitted for every 8 encoded bits, resulting in an overall punctured code rate ⅘, that is, 5 bits are generated according to 4 input bits.

Finally, the QAM mapper 340 receives uncoded bit streams 301, 302, 303 and 304, and the encoded bit streams 329 ($U_1, U_2, U_3, U_4, U_5$) and 229 ($V_1, V_2, V_3, V_4, V_5$) from punctured binary convolutional encoders 320 and 330, and produces a 64-QAM output symbol stream.

Figure 6:
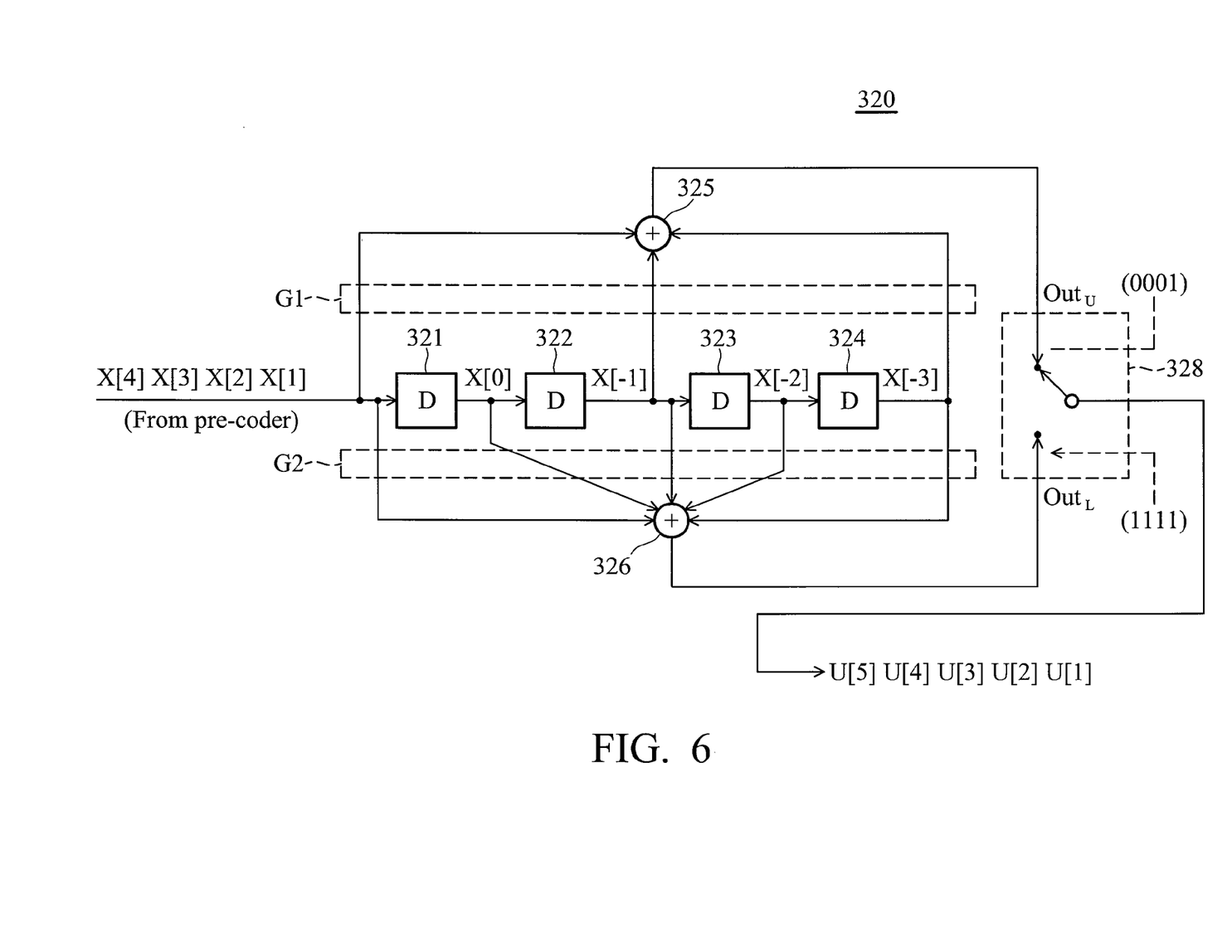
FIG. 6 is a block diagram of a punctured binary convolutional encoder in accordance with the second embodiment of the invention.

Furthermore, FIG. 6 is a block diagram of the punctured binary convolutional encoder 320 shown in FIG. 5. The punctured binary convolutional encoder 330 has a structure similar to that of encoder 320 and will not be described again. It is noted that the error check equation deduced in the following discussion can also be applied to the punctured binary convolutional encoder 330. The punctured binary convolutional encoder 320 includes four registers 321, 322, 323 and 324, two exclusive-OR logic gates 325 and 326, and a commutator 328. The four registers 321-324 store four previous input bits $X[0], X[-1], X[-2]$ and $X[-3]$, and there are 16 states in the punctured binary convolutional encoder 320. As shown in FIG. 6, codes $OUT_U$ and $OUT_L$ can be expressed by:

$$OUT_U = X[1] \oplus X[-1] \oplus X[-3]; \quad (12)$$

$$OUT_L = X[1] \oplus X[0] \oplus X[-1] \oplus X[-2] \oplus X[-3] \quad (13)$$

Equations (12) and (13) are determined by generating codes G1 and G2, where G1=[010101] and G2=[011111]. It is noted that different convolutional coders have different generating codes. Commutator 328 implements the puncture function using puncture matrix [P1;P2]=[0001;1111], where "0" indicates no transmission and "1" indicate transmission in order.

For each trellis group, the punctured binary convolutional encoder 320 can generate 8 encoded bits from 4 input bits represented by $X[1], X[2], X[3]$ and $X[4]$. The commutator 328 selects 5 bits from the 8 encoded bits to be outputs $U[1], U[2], U[3], U[4]$ and $U[5]$ according to the puncture matrix. Here a group of the output bits (for example, $U[5], U[4], U[3], U[2], U[1]$) can be expressed as functions of a corresponding group of the input bits (for example, $X[4], X[3], X[2], X[1]$) and previous input bits (or internal states of the encoder, $X[0], X[-1], X[-2], X[-3]$). Generally, in an n-th group, the five output bits can be expressed by:

$$U[n+1] = X[n+1] \oplus X[n] \oplus X[n-1] \oplus X[n-2] \oplus X[n-3];$$

$$U[n+2] = X[n+2] \oplus X[n+1] \oplus X[n] \oplus X[n-1] \oplus X[n-2];$$

$$U[n+3] = X[n+3] \oplus X[n+2] \oplus X[n+1] \oplus X[n] \oplus X[n-1];$$

$$U[n+4] = X[n+4] \oplus X[n+2] \oplus X[n];$$

$$U[n+5] = X[n+4] \oplus X[n+3] \oplus X[n+2] \oplus X[n+1] \oplus X[n];$$

wherein n represents an index. In addition to the n-th group, two previous groups (the (n−2)-th and (n−1)-th groups) and two following groups (the (n+1)-th and (n+2)-th groups) are also listed for reference:

the (n−2)-th group:

$$U[n-9] = X[n-7] \oplus X[n-8] \oplus X[n-9] \oplus X[n-10] \oplus X[n-11];$$

$U[n-8]=X[n-6] \oplus X[n-7] \oplus X[n-8] \oplus X[n-9] \oplus X[n-10]$;

$U[n-7]=X[n-5] \oplus X[n-6] \oplus X[n-7] \oplus X[n-8] \oplus X[n-9]$;

$U[n-6]=X[n-4] \oplus X[n-6] \oplus X[n-8]$;

$U[n-5]=X[n-4] \oplus X[n-5] \oplus X[n-6] \oplus X[n-7] \oplus X[n-8]$;

the (n−1)-th group:

$U[n-4]=X[n-3] \oplus X[n-4] \oplus X[n-5] \oplus X[-6] \oplus X[-7]$;

$U[n-3]=X[n-2] \oplus X[n-3] \oplus X[n-4] \oplus X[n-5] \oplus X[n-6]$;

$U[n-2]=X[n-1] \oplus X[n-2] \oplus X[n-3] \oplus X[n-4] \oplus X[n-5]$;

$U[n-1]=X[n] \oplus X[n-2] \oplus X[n-4]$;

$U[n]=X[n] \oplus X[n-1] \oplus X[n-2] \oplus X[n-3] \oplus X[n-4]$;

the (n+1)-th group:

$U[n+6]=X[n+5] \oplus X[n+4] \oplus X[n+3] \oplus X[n+2] \oplus X[n+1]$;

$U[n+7]=X[n+6] \oplus X[n+5] \oplus X[n+4] \oplus X[n+3] \oplus X[n+2]$;

$U[n+8]=X[n+7] \oplus X[n+6] \oplus X[n+5] \oplus X[n+4] \oplus X[n+3]$;

$U[n+9]=X[n+8] \oplus X[n+6] \oplus X[n+4]$;

$U[n+10]=X[n+8] \oplus X[n+7] \oplus X[n+6] \oplus X[n+5] \oplus X[n+4]$;

the (N+2)-th group:

$U[n+11]=X[n+9] \oplus X[n+8] \oplus X[n+7] \oplus X[n+6] \oplus X[n+5]$;

$U[n+12]=X[n+10] \oplus X[n+9] \oplus X[n+8] \oplus X[n+7] \oplus X[n+6]$;

$U[n+13]=X[n+11] \oplus X[n+10] \oplus X[n+9] \oplus X[n+8] \oplus X[n+7]$;

$U[n+14]=X[n+12] \oplus X[n+10] \oplus X[n+8]$;

$U[n+15]=X[n+12] \oplus X[n+11] \oplus X[n+10] \oplus X[n+9] \oplus X[n+8]$.

According to the five consecutive groups of the output bits, an error-check equation, irrelevant to the input bits X, can be found out as follows:

$$U[n-6] \oplus U[n-5] \oplus U[n-4] \oplus U[n-3] \oplus U[n-2] \oplus U[n-1] \\ \oplus U[n+1] \oplus U[n+4] \oplus U[n+5] \oplus U[n+8] \oplus U[n+9] \\ \oplus U[n+11] \oplus U[n+12] \oplus U[n+13] \oplus U[n+14] \oplus U[n+15]=0 \quad (14)$$

Using the error-check equation (14) inherent in the transmitter complying with the J83B standard, an apparatus for determining an estimated symbol error rate can be designed. On the other hand, in the receiver of the J83B cable system, it is necessary to ascertain the puncture boundary or punctured position from an incoming bit stream since there is no training sequence therein. As illustrated, a group of five output coded bits is generated by four input bits, indicating five possible punctured positions for the incoming bit stream of the TCM decoder in the receiver. Thus, the error check equation (14) can only be applied to estimate the SER if the correct punctured position is determined among the five possible punctured positions, which is slightly different from the first embodiment.

Figure 7:
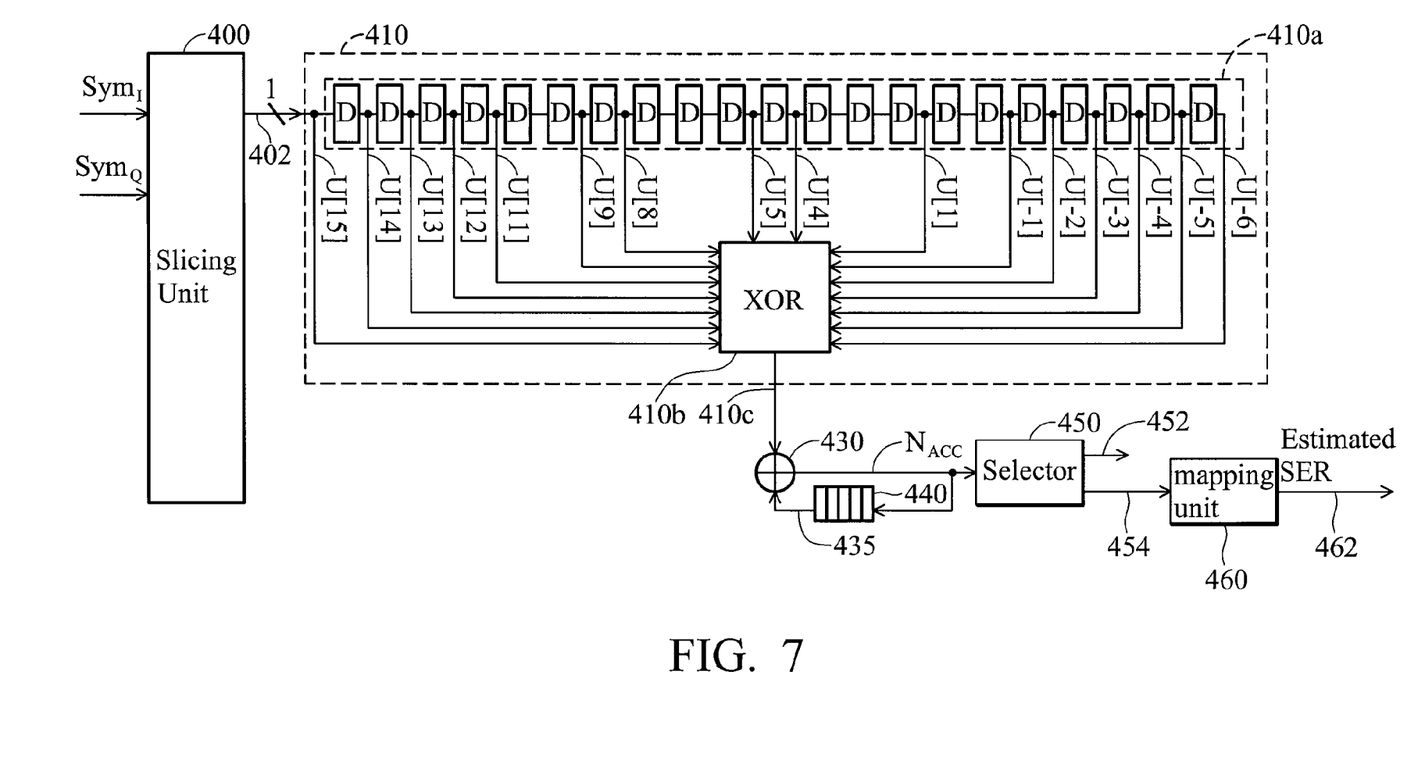
FIG. 7 is a block diagram of an apparatus for determining an estimated symbol error rate in a digital communication receiver in accordance with the second embodiment of the invention.

FIG. 7 is a block diagram of the apparatus for determining an estimated symbol error rate in the receiver in accordance with the second embodiment, which complies with the J83B standard and utilizes the error check equation (14) to estimate the SER. In the receiver, a signal stream is received and consecutively demodulated by a QAM demodulator (not shown) into an in-phase symbol stream $Sym_I$ and a quadrature symbol stream $Sym_Q$, using 64-QAM demodulation scheme in this embodiment. The apparatus of FIG. 7 receiving the in-phase symbol stream $Sym_I$ and the quadrature symbol stream $Sym_Q$, includes a slicing circuit 400, a combinational logic unit 410, an adder 430, a buffer circuit 440, a selector 450 and a mapping unit 460. The combinational logic unit 410 includes a delay line circuit 410a having a plurality of delay elements D connected in series, and a XOR logic gate 410b having a plurality of inputs respectively coupled to the outputs of a part of the delay elements D of the delay line circuit 410a. In addition, the adder 430, the buffer circuit 440 and the selector 450 constituting the accumulator 30 shown in FIG. 1 generates the parity check error rate 454.

The slicing circuit 400 receives the in-phase symbol stream $Sym_I$ and the quadrature symbol stream $Sym_Q$ and generates a corresponding bit stream 402, which corresponds to one of the coded bit streams 329 and 339 (U or V) in the transmitter. In the embodiment, only the coded bit stream U is illustrated.

The bit stream 402 is sent to the combinational logic unit 410. In the combinational logic unit 410, the delay line circuit 410a stores a finite sequence of the bit stream 402 using a plurality of unit delay elements D connected in series. As depicted in FIG. 7, the delay line circuit 410a has 21 unit delay elements to store the sequence from U[n−6] to U[n+14] of the bit stream 402. According to the error check equation (14), the outputs of the first (Right), second, third, fourth, fifth, sixth, eighth, eleventh, twelfth, fifteenth, sixteenth, eighteenth, nineteenth, twentieth, and twenty-first (Left) unit delay elements and the current bit are connected to the inputs of the XOR logic gate 410b. The XOR logic gate 410b consecutively performs XOR operation on these inputs to generate an error check bit stream 410c. Each bit in the error check bit stream 410c represents the result of the error check equation (14).

Adder 430 sums the error check bit stream 410c and a feedback number stream 435 from the buffer circuit 440 to output an accumulated number stream $N_{ACC}$. In the embodiment, the buffer circuit 440 has 5 buffer elements corresponding to the five possible punctured positions to store and shift the accumulated number stream $N_{ACC}$, forming the feedback number stream 435. Adder 430 and the buffer circuit 440 can accumulate the results of the XOR operations based on the error check equation (14) for the five possible punctured positions, respectively. According to error check equation (14), in the ideal case, the result of the logic operation XOR should be zero if the corresponding punctured position is correct, and should be one if the corresponding punctured position is incorrect. Accordingly, the accumulated number of the accumulated number stream $N_{ACC}$ corresponding to the correct punctured position remains at or is close to zero while those corresponding to the incorrect punctured positions increase rapidly.

Selector 450 selects one of the five possible punctured positions based on the accumulated number stream $N_{ACC}$ with a minimal value and generates an indicator 452 indicating a detected punctured position at an instant when predetermined iterations have been performed. The detected punctured position indicated by the indicator 452 corresponds to one of the five buffer elements storing a minimal value of the accumulated number stream $N_{ACC}$. On the other hand, the selector 450, based on the selected punctured position, can generate the nominal error-check error number and the nominal error-check error rate 454 can inherently be obtained by dividing the number of current trials (the minimal value stored in the buffer element) over the total number of error check operations.

Figure 8:
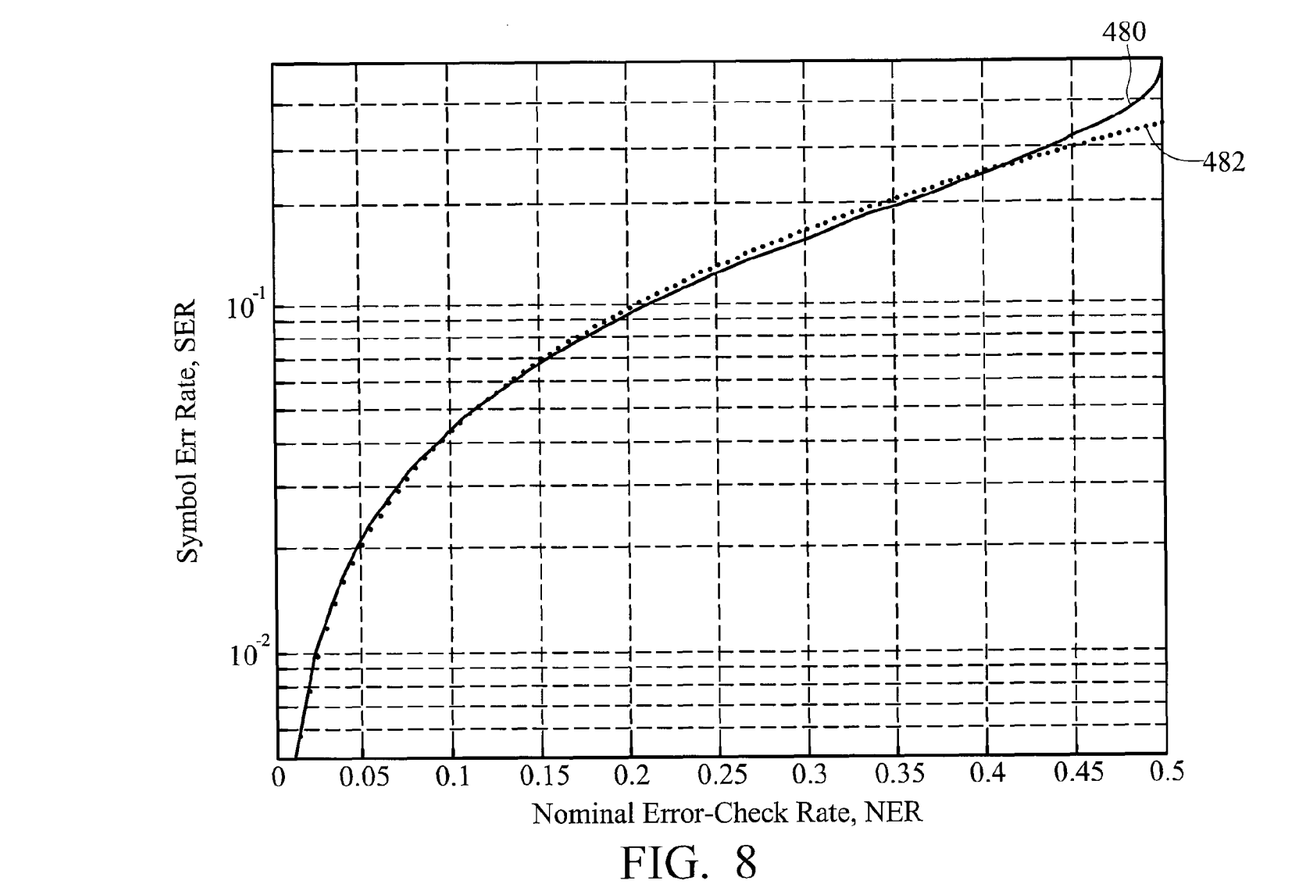
FIG. 8 is a graph showing the relation between the nominal error-check rate and the symbol error rate applied in the mapping unit in accordance with the first embodiment of the invention.

Finally, the mapping unit 460 converts the nominal error-check rate 454 to an estimated symbol error rate (SER) 462 with respect to the input symbol streams $Sym_I$ and $Sym_Q$ according to a predetermined relation between the nominal error-check rate and the estimated symbol error rate, which can be determined if the error check equation is known. Similar to the first embodiment, the relation between the NER and the estimated SER can be determined by calculating the bit error rates for various conditions, deducing the relation between these bit error rates with the NER and the estimated SER and finally finding out the relation between the NER and the estimated SER. FIG. 8 is a graph showing the relation between the NER and the estimated SER applied in the mapping unit 460 in accordance with the embodiment. In FIG. 8, numeral 480 denotes a plot of the curve showing the relation between the NER and the estimated SER. Thus, in the embodiment, the mapping unit 460 can convert the NER 454 to the estimated SER 462 using linear or piece-wise linear or other curve-fitting approximation.

As described above, the apparatus for determining the estimated SER in the receiver complying with the J83B standard can utilize the predetermined error check equation, which is deduced based on the transmitter, to achieve the object of the embodiment.

In the embodiment, the input bit stream relevant to coded bits U is chosen to illustrate the details, which is not used to limit the scope the invention. It is noted that the input bit streams relevant to coded bits U and V can individually or simultaneously achieve the objective of generating an estimated symbol error rate in a receiver. Simultaneous usage of the input bit streams relevant to coded bits U and V can shorten the cycle of iterations for testing but requires more components.

Alternatively, the claimed invention error-metric detector can be wildly use in all application for estimation symbol error rate or bit error rate. For example, DVB standard ETSI EN300 421 V1.1.2 (1997-08), 744 V1.4.1 (2001-01) or ETSI EN 300 468 V1.5.1 can be used as the same. The invention can be used in a plurality of applications, which need of error detection function, specially requiring decoding/puncturing application, calculating convolution errors, and other application required to estimate error metric on the receiver side of digital communication. Of course, the scope of the invention should not be limited thereto.

Third Embodiment

Figure 9:
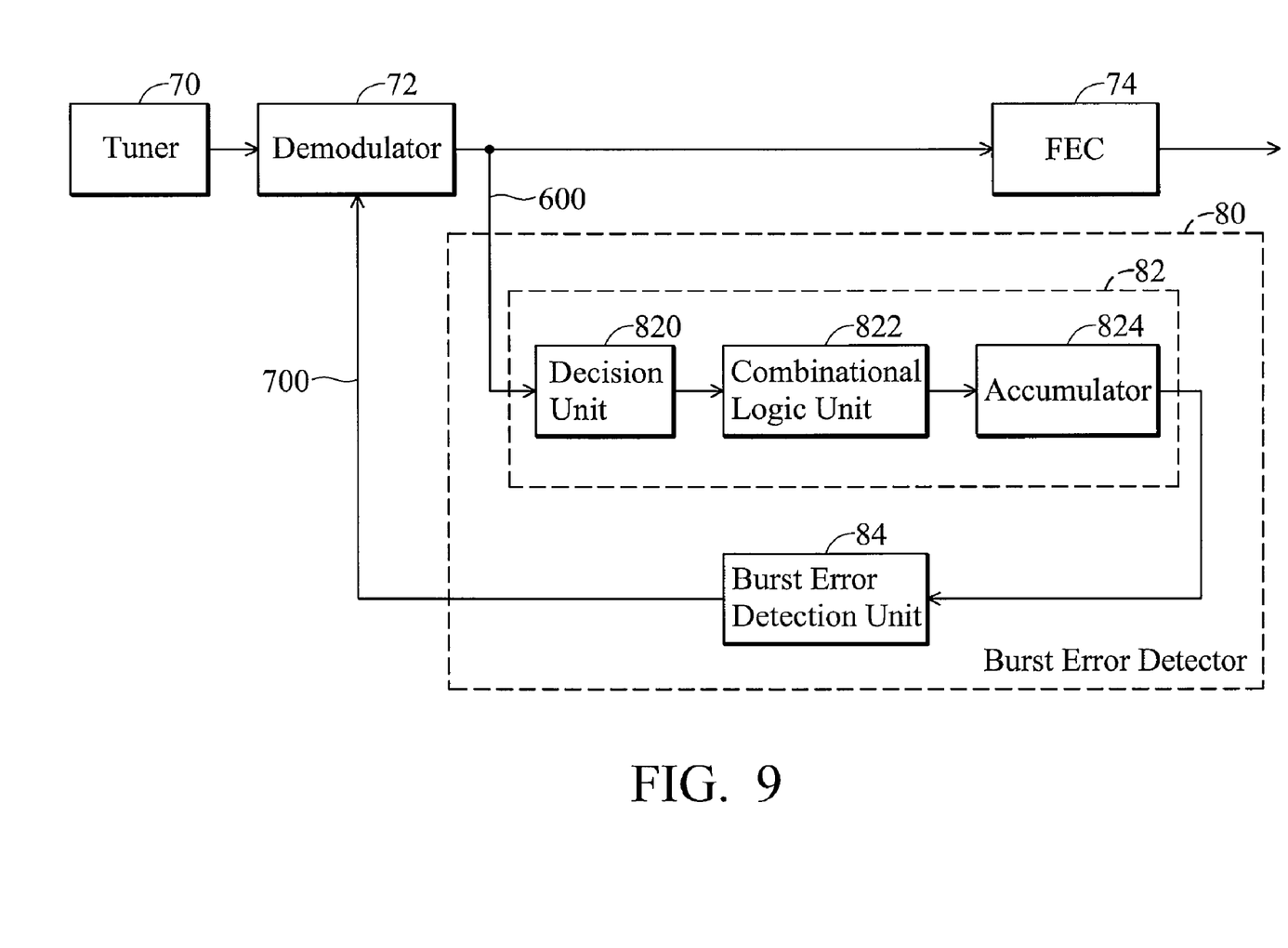
FIG. 9 is a block diagram of a digital communication receiver using the error-check detector to determine burst error in accordance with the third embodiment of the invention.

In the third embodiment, the communication system is used to determine burst error in order to feedback the burst error indicator to the demodulator. FIG. 9 is a block diagram to illustrate using the apparatus of error-check detector to find accumulated error similarly to prior illustration in the first and second embodiments, but taking those data to a burst error detector to determine the burst error instead of passing those data into the mapping unit as the method for estimating the symbol error rate. Since burst error normally need to be determined within the short period of time unlike estimating symbol error rate normally wait for the longer period of time in order to analyze the data stream, the predetermined time period need to be set in order to promptly detect the burst error. Generally, there is a plurality of method proposed for detecting the burst error. Herein the preferred method and embodiment of present invention use a fixed, single-level, multi-level, or adaptively threshold to detect burst error. The threshold could also be determined according to previous training or system desired. The determination of the burst error is fed back into demodulator to further adjust the error-checking equation.

FIG. 9 is a block diagram of a digital communication receiver using the error-check detector shown in FIG. 1 to determine the burst error in accordance with the embodiment. The digital communication receiver can be a high fidelity digital television set complying to the DVB standard or the like. As shown in FIG. 9, the receiver has a tuner 70, a demodulator 72, a FEC (forward error corrector) 74 and a burst error detector 80. The burst error detector 80 includes an error-check detector 82, which is the same as the one shown in FIG. 1, and a burst error detection unit 84. Tuner 70, usually coupled to an antenna, is used to tune a RF digital signal and produces a received symbol stream corresponding to a selected channel by down-converting. Demodulator 72 demodulates the received symbol stream using a demodulation scheme associated with the modulation scheme utilized in the transmitter, such as Quadrature Phase Shift Keying (QPSK) and Quadrature Amplitude Modulation (QAM). FEC 74 decodes the demodulated symbols into the recovered bits using a convolutional decoder, such as Viterbi decoder. In the embodiment, burst error detector 80 is used to determine the burst error using the demodulated symbols 600 and produces a burst error indicator 700 to demodulator 72 to further adjust the error-check equation.

Error-check detector 82 has a decision unit 820, a combinational logic unit 822 and an accumulator 824. As described above, decision unit 820 receives the demodulated symbols 600 and generates at least one input bit stream. Combinational logic unit 822 performs a combinational logic operation on delayed and current bits of the input bit stream in accordance with a polynomial error-check equation to generate an error-check bit stream, which represents results of the combinational logic operation. Finally accumulator 824 accumulates a number of trials with respect to the error check bit stream and generates a nominal error-check number based on the number of the correct trials. Unlike the previous embodiments, the nominal error-check number is fed into burst error detection unit 84 to detect the burst error. As described above, burst error detection unit 84, using predetermined threshold, verifies the nominal error-check number to detect the burst error and produces the burst error indicator 700 to feed back into the demodulator 72.

As described in this embodiment, the error-check detector described in FIG. 1 can also be used to determine the burst error in the communication system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for calculating error metrics in a digital communication receiver, comprising:
a decision unit receiving an input data stream for generating at least one input bit stream;

a combinational logic unit, coupled to the decision unit, for performing a combinational logic operation on delayed and current bits of the at least one input bit stream in accordance with a polynomial error-check equation to generate an error-check bit stream; and an accumulator, coupled to the combinational logic unit, for accumulating a number of trials with respect to said error-check bit stream and generating a nominal error-check number based on the number of the correct trials.

2. The apparatus of claim 1, wherein the decision unit is a slicing unit for transforming the data stream into coded bit stream if received input data stream is a symbol stream.

3. The apparatus of claim 1, wherein the decision unit is a converting unit for converting parallel coded bits into serial coded bit stream if received input data stream is a parallel coded bits.

4. The apparatus of claim 1, wherein the combinational logic unit comprises:

a delay line circuit having a plurality of delay elements connected in series for storing a finite sequence of the bit stream; and an Exclusive-OR (XOR) logic gate having a plurality of inputs, respectively coupled to the outputs of a part of the delay elements of the delay line circuit in accordance with said error-check equation with respect to said finite sequence of the bit stream, for performing a logic operation on the outputs of the part of the delay elements to output the error-check bit stream.

5. The apparatus of claim 1 further comprising: a mapping unit, coupled to the accumulator, for converting said calculated nominal error-check number to an estimated symbol error rate with respect to the input data stream according to a predetermined relation between the nominal error-check number and the estimated symbol error rate.

6. The apparatus of claim 5, wherein a predetermined relation between the nominal error-check number and the estimated symbol error rate is a linear approximation or a piece-wise linear approximation.

7. The apparatus of claim 1 further comprising: a burst detection unit, couple to the accumulator, for detecting the burst error according to the accumulated nominal error-check number generated from the accumulator within a predetermined period of time.

8. The apparatus of claim 7, wherein the burst error is detected by comparing the nominal error-check number with at least one of fixed, single-level, multi-level, or adaptive threshold to determine the occurrence of error burst within a predetermined period of time.

9. The apparatus of claim 1, wherein the input data stream complies with the 8-level vestigial sideband (8-VSB) standard.

10. The apparatus of claim 1, wherein the input data stream complies with the standard of the ITU-T Recommendation J.83 Annex B.

11. The apparatus of claim 1, wherein the input data stream complies with the standard of DVB Standard.

12. The apparatus of claim 1, wherein the accumulator comprises:

an adder for summing the error-check bit stream and a feedback number stream to form an accumulated number stream;

a buffer for storing the accumulated number stream to form the feedback number stream; and means for generating the nominal error-check number based on a value stored in the buffer.

13. The apparatus of claim 12, wherein a buffer having a plurality of buffer elements associated with a plurality of possible punctured positions with respect to the input symbol stream, for storing the accumulated number stream to form the feedback number stream.

14. The apparatus of claim 13 further comprising means for selecting one of the possible punctured positions based on the accumulated number stream with a minimal value and generating the nominal error-check number based on the minimal value corresponding to the selected punctured position.

15. The apparatus of claim 1, wherein the input data stream is provided by a transmitter generating the input data stream according to information bit stream, and the polynomial error-check equation is irrelevant to the information bit stream.

16. The apparatus of claim 1, wherein the input data stream is provided by a transmitter, and the polynomial error-check equation is determined according to a coding scheme applied in the transmitter.

17. A method for calculating error metrics in a digital communication receiver, comprising:

generating at least one input bit stream from an input data stream;

performing a combinational logic operation on delayed and current bits of the at least one input bit stream in accordance with a polynomial error-check equation to generate an error-check bit stream;

accumulating a number of trials with respect to said error-check bit stream; and generating a nominal error-check number based on the number of the correct trials.

18. The method of claim 17 further comprising transforming the data stream into coded bit stream if received input data stream is a symbol stream.

19. The method of claim 18 further comprising converting parallel coded bits into serial coded bit stream if received input data stream is a parallel coded bits.

20. The method of claim 19, wherein the combinational logic operation step comprises:

storing a finite sequence of the bit stream in a delay line circuit having a plurality of delay elements connected in series; and applying an Exclusive-OR (XOR) logic operation to the outputs of a part of the delay elements of the delay line circuit in accordance with said error-check equation with respect to said finite sequence of the bit stream.

21. The method of claim 17 further comprising the step of converting said calculated nominal error-check number to an estimated symbol error rate with respect to the input data stream according to a predetermined relation between the nominal error-check number and the estimated symbol error rate.

22. The method of claim 21, wherein a predetermined relation between the nominal error-check number and the estimated symbol error rate is a linear approximation or a piece-wise linear approximation.

23. The method of claim 17 further comprising the step of detecting the burst error according to the accumulated nominal error-check number generated from the accumulator within a predetermined period of time.

24. The method of claim 23, wherein the burst error is detected by comparing the nominal error-check number with at least one of single-level or multi-level threshold to determine the occurrence of error burst within a predetermined period of time.

25. The method of claim 17, wherein the input data stream complies with the 8-level vestigial sideband (8-VSB) standard.

26. The method of claim 17, wherein the input data stream complies with the standard of the ITU-T Recommendation J.83 Annex B.

27. The method of claim 17, wherein the input data stream complies with the standard of DVB Standard.

28. The method of claim 17, wherein the step of accumulating comprises:
    summing the error-check bit stream and a feedback number stream to form an accumulated number stream;
    storing the accumulated number stream to form the feedback number stream; and
    generating the nominal error-check number based on a value stored in the buffer.

29. The method of claim 28, wherein the feedback number is stored in a buffer having a plurality of buffer elements associated with a plurality of possible punctured positions with respect to the input data stream, for storing the accumulated number stream to form the feedback number stream.

30. The method of claim 29 further comprising step of selecting one of the possible punctured positions based on the accumulated number stream with a minimal value and generating the nominal error-check number based on the minimal value corresponding to the selected punctured position.

31. The method of claim 17, wherein the input data stream is provided by a transmitter generating the input data stream according to information bit stream, and the polynomial error-check equation is irrelevant to the information bit stream.

32. The method of claim 17, wherein the input data stream is provided by a transmitter, and the polynomial error-check equation is determined according to a coding scheme applied in the transmitter.

* * * * *